(12) United States Patent
Van Holten et al.

(10) Patent No.: US 11,878,866 B2
(45) Date of Patent: Jan. 23, 2024

(54) BOMB BAY SORTER AND TRAY

(71) Applicant: EAE SOLUTIONS HOLDING B.V., Oosterhout (NL)

(72) Inventors: Erik Andreas Van Holten, Teteringen (NL); Menno Jansen, Oosterhout (NL)

(73) Assignee: EAE SOLUTIONS HOLDING B.V., Oosterhout (NL)

( * ) Notice: Subject to any disclaimer, the term of this patent is extended or adjusted under 35 U.S.C. 154(b) by 11 days.

(21) Appl. No.: 17/607,742

(22) PCT Filed: Apr. 30, 2020

(86) PCT No.: PCT/NL2020/050276
§ 371 (c)(1),
(2) Date: Oct. 29, 2021

(87) PCT Pub. No.: WO2020/222647
PCT Pub. Date: Nov. 5, 2020

(65) Prior Publication Data
US 2022/0204275 A1 Jun. 30, 2022

(30) Foreign Application Priority Data
Apr. 30, 2019 (NL) .................................... 2023040

(51) Int. Cl.
*B65G 17/12* (2006.01)
*B65G 47/38* (2006.01)
(52) U.S. Cl.
CPC ............. *B65G 17/12* (2013.01); *B65G 47/38* (2013.01)

(58) Field of Classification Search
CPC ......... B65G 17/12; B65G 47/38; B65G 17/34
See application file for complete search history.

(56) References Cited

U.S. PATENT DOCUMENTS

| 9,546,047 B2 * | 1/2017 | Brotzmann | .......... B65G 17/065 |
| 2003/0051313 A1 | 3/2003 | Wu | |
| 2017/0197233 A1 * | 7/2017 | Bombaugh | ............... B07C 5/36 |

(Continued)

FOREIGN PATENT DOCUMENTS

| CH | 710851 A1 * | 9/2016 |
| CH | 0710851 A1 | 9/2016 |
| EP | 1448463 A1 | 8/2004 |

(Continued)

*Primary Examiner* — Gene O Crawford
*Assistant Examiner* — Abby A Jorgensen
(74) *Attorney, Agent, or Firm* — TAROLLI, SUNDHEIM, COVELL & TUMMINO L.L.P.

(57) ABSTRACT

The tray body comprises a support surface and a spring for spring biasing the tray door relative to the tray body to urge the tray door to open. When the tray door is fully opened, it rests against the support surface under the influence of a spring biasing force, provided by the spring, that exceeds a first non-zero threshold. The tray body comprises a tray frame and a door shaft that defines an axis of rotation of the tray door and the spring comprises a torsion spring arranged around the door shaft. The tray door comprises a shaft channel in which the door shaft is rotatably accommodated. The torsion spring has one end fixed coupled to the door shaft and another end to an inside wall of the shaft channel and/or the damper is arranged in the shaft channel and fixed in position relative to the door shaft.

17 Claims, 10 Drawing Sheets

(56) References Cited

U.S. PATENT DOCUMENTS

2018/0273297 A1* 9/2018 Wagner ................ B65G 1/1371

FOREIGN PATENT DOCUMENTS

| EP | 1448463 B1 * | 10/2007 | ............. B65G 17/14 |
| NL | 1000316 C2 * | 11/1996 | ............. B65G 47/38 |
| NL | 1000316 C2 | 11/1996 | |
| WO | WO-03042079 A1 * | 5/2003 | ............. B65G 17/14 |
| WO | WO-03042080 A1 * | 5/2003 | ............. B65G 17/14 |
| WO | WO-2017083109 A2 * | 5/2017 | ............. B65G 17/34 |

* cited by examiner

BOMB BAY SORTER AND TRAY

CROSS-REFERENCE TO RELATED APPLICATION

This application is a U.S. National Stage Application filed under 35 U.S.C. § 371 of PCT/NL2020/050276, filed Apr. 30, 2020, and entitled BOMB BAY SORTER AND TRAY, which International Application claims the benefit of priority from Netherland Patent Application No. 2023040, filed on Apr. 30, 2019. The entire contents of each of the above-identified patent applications are incorporated herein by reference.

The present invention relates to a bomb bay sorter and to a tray to be used in such a system.

Bomb bay sorters are known in the art. For example, a bomb bay sorter according to the preamble of claim 1 is known from NL1000316C2. This bomb bay sorter comprises a conveying system and a plurality of trays. Each tray comprises a tray body coupled to the conveying system. Each tray further comprises a tray door that is hingedly connected to the tray body and that can be closed and opened to carry and release an object held in the tray, respectively. To keep the tray in a closed position, the tray further comprises a locking member to releasably lock the tray door in a closed position.

An important performance parameter of a bomb bay sorter is the number of objects or goods it is able to sort per unit time. This parameter is mainly determined by the speed of the conveying system, the time that is required to load the objects into the trays, and the time that is required for unloading or discharging the objects at a desired position. Here, it is noted that bomb bay sorters are typically configured to unload the same or different objects at different positions. For example, the different positions may correspond to different consumers and at each position a box or bag may be provided into which the object(s) for this consumer is/are dropped.

As speeds of bomb bay sorters have gradually increased over time, so has the noise associated with mechanical movement of the tray doors. This noise is associated with a non-optimal control of the movement of the tray doors.

An object of the present invention is to provide a tray sorter in which the movement of the tray door can be controlled in a noise reducing manner.

This object has been achieved with the bomb bay sorter of claim 1 that is characterized in that the tray body comprises a support surface and a spring for spring biasing the tray door relative to the tray body to urge the tray door to open. According to the invention, when the tray door is fully opened, it rests against the support surface under the influence of a spring biasing force, provided by the spring, that exceeds a first non-zero threshold.

The use of a spring to urge the door to open allows for a faster opening of the tray door compared to tray doors of existing bomb bay sorters that rely on gravitational force to open the tray doors. At the same time, the non-zero spring biasing force provided by the spring causes the tray door to rest against the support surface when it is fully opened. Compared to known bomb bay sorters, the position of the tray door relative to the frame body is more stable thereby avoiding the noise associated with loosely hanging fully opened tray doors during transport by the conveying system.

According to the invention, the tray door is pushed, under the influence of the spring biasing force, against the support surface. The skilled person will readily understand that the spring biasing force by which the tray door is pushed against the support surface cannot be chosen arbitrarily large as this may damage the tray doors or as this may result in unacceptable noise levels. On the other hand, the biasing force cannot be chosen too small as in such case the tray door may still continue to repeatedly come into contact with the support surface thereby also causing noise.

When the tray door is closed, it preferably experiences a spring biasing force provided by the spring that exceeds a second threshold larger than the first threshold. In this manner, the tray can be opened relatively quickly whereas sufficient biasing force will remain in the fully opened position to keep the tray door pressed against the support surface.

The tray door may comprise a damper for damping at least a part of the movement of the tray door from the closed position to a fully opened position. Here, the fully opened position corresponds to the position in which the tray door rests against the support surface. The damper provides for an efficient means to absorb the kinetic energy gained by the tray door as a result of the spring biasing force and to slow the tray door such that it can quickly rest against the support surface.

The damper may be configured to provide a damping force for damping the movement of the tray door only after the tray door has rotated from the closed position over a predefined threshold angle relative to the tray body. In this embodiment, the damper will only dampen the movement in the final stages of the movement of the tray door, i.e. when it approaches the fully opened position. As an example, the damper can be made of resilient material. Moreover, the damper may define the support surface. The support surface may therefore correspond to a surface or part thereof of the damper.

When made of resilient material, compression of the resilient material of the damper may compensate the spring force exerted by the spring on the tray door. Put differently, the spring biasing force causes the tray door to compress the damper thereby moving the support surface. As a result of the compression the damper will push onto the tray door. When these forces have become equal, the tray door has attained the fully opened position.

The tray body may comprise a tray frame and a door shaft that defines an axis of rotation of the tray door. The spring may comprise a torsion spring arranged around the door shaft. In an embodiment, the door shaft is rotatably received in the tray frame and is fixedly connected to the tray door. In such embodiment, one end of the torsion spring would be connected to the tray frame whereas another end would be connected to one of the door shaft and tray door.

The present invention does not exclude that the tray body is made from at least partially flexible material. For example, the tray body may comprise a bag that is provided at an upper side with a first rigid part that is coupled to the conveying system, and at a lower side with a second rigid part to which the tray door is coupled. In another or further embodiment, the tray body comprises both a bag and a frame, wherein the frame is arranged inside the bag.

In another embodiment, the door shaft is fixed relative to the frame body, wherein the tray door is rotatably coupled to the door shaft. In this embodiment, the torsion spring is arranged in between the door shaft and the tray door. Moreover, one end of the torsion spring would be connected to one of the tray frame and the door shaft whereas another end would be connected to the tray door.

The door shaft, and thereby the axis of rotation, can be positioned perpendicular to a movement direction of the tray.

In case the door shaft is fixed relative to the frame body, the tray door may comprise a shaft channel in which the door shaft is rotatably accommodated. Moreover, the torsion spring may have one end fixed coupled to the door shaft and another end to an inside wall of the shaft channel. Alternatively or additionally, the damper may be arranged in the shaft channel and fixed in position relative to the door shaft. For example, the or an inside wall of the shaft channel may comprise a protruding surface that is configured to engage the support surface of the damper after a predefined relative rotation of the door shaft and tray door.

The conveying system may comprise an engaging unit having an engaging member that is configured to selectively engage the locking member to allow the tray door to open. Here, selectively engaging should be interpreted as including an embodiment in which a controller is provided that controls whether the engaging member engages the locking member or not. For example, different engaging units can be positioned at desired unloading positions. By controlling which engaging unit will engage the locking member, the position at which the object will be dropped can be controlled. For example, the engaging unit can be arranged at a fixed position in the conveying system, wherein the engaging unit comprises an actuator for actuating the engaging member to engage the locking member.

The locking member may comprise a protruding member that, when the tray door is closed, prevents the tray door from opening. This protruding member may extend underneath the tray door. Additionally or alternatively, the bomb bay sorter may further comprise an arm or other mechanical transmission configured to, when the locking unit is engaged by the engaging member, move the protruding member away from the tray door to allow it to open. Furthermore, the arm may be configured to move the protruding member between a first position, in which it may lock the tray door, and a second position, in which it cannot lock the tray door. Such arm may be spring biased by a further spring to urge the arm to the first position. The protruding member may comprise an inclined surface to allow the tray door to close when the tray door is pushed against in a manner that overcomes the spring biasing caused by said spring. Accordingly, the protruding member is configured to block the tray door when moving from a closed position to an open position, and to allow the tray door to move back from the open position to the closed position because in this latter case the tray door may engage the inclined surface to thereby push away the protruding member.

The conveying system may further comprise a first closing member and the tray door may comprise a second closing member, wherein the first closing member is configured to engage the second closing member to thereby push the tray door to close. Such first closing member may be arranged at a fixed position in the conveying system. Moreover, when multiple identical trays are used, the first closing member may be configured to close each tray door when it comes into engagement therewith.

The tray may comprise a pair of tray doors as discussed above, wherein the tray doors are oppositely arranged. An operation of opening a first tray door of the pair of tray doors can be mechanically coupled to an operation of opening a second tray door of the pair of tray doors such that the first and second tray door open at substantially the same time.

Alternatively, the bomb bay sorter may be configured such that the respective tray doors open at different times. To that end, the bomb bay sorter may further comprise a respective engaging unit as defined above for engaging the locking members for the respective tray doors, wherein the bomb bay sorter may further comprise a controller for individually and separately controlling the engaging units. Alternatively, the single engaging unit as described above can be configured to engage the locking members for the respective tray doors, wherein the bomb bay sorter may further comprise a controller for controlling the engaging unit to engage the respective locking members at respective and different moments in time.

The tray may comprise, on opposite sides, guiding members that are received in respective guiding tracks of the conveying system.

The bomb bay sorter may comprise a plurality of the trays described above, each coupled to the conveying system. Such trays can be mutually coupled using coupling members that are each hingedly connected, on opposite sides, to adjacent trays. The conveying system may comprise a driving unit, such as an electric motor, for driving the coupling members to cause the trays to move.

The conveying system may be configured to move the tray from a loading position, at which the object is arranged in the tray, to a discharge position, at which the object is released from the tray. As noted above, the conveying system can be configured to release the object at a particular position among a plurality of different positions, wherein at each position, a separate engaging unit is provided.

The tray body may be rotatably coupled to the conveying system. For example, the tray body may rotate about an axis that is perpendicular to a moving direction of the tray.

According to a second aspect, the present invention provides a tray configured to be used in a bomb bay sorter as defined above. This tray comprises a tray body configured to be coupled to the conveying system of the bomb bay sorter, and a tray door that is hingedly connected to the tray body and that can be closed and opened to carry and release an object held in the tray, respectively. The tray further comprises a locking member to releasably lock the tray door in a closed position. The tray is characterized in that the tray body comprises a support surface and a spring for spring biasing the tray door relative to the tray body to urge the tray door to open. According to the invention, when the tray door is fully opened, it rests against the support surface under the influence of a spring biasing force provided by said spring that exceeds a first non-zero threshold.

This tray can be configured as the tray of the abovementioned bomb bay sorter.

Next, the invention will be described in more detail referring to the appended drawings, wherein.

Figure 1:
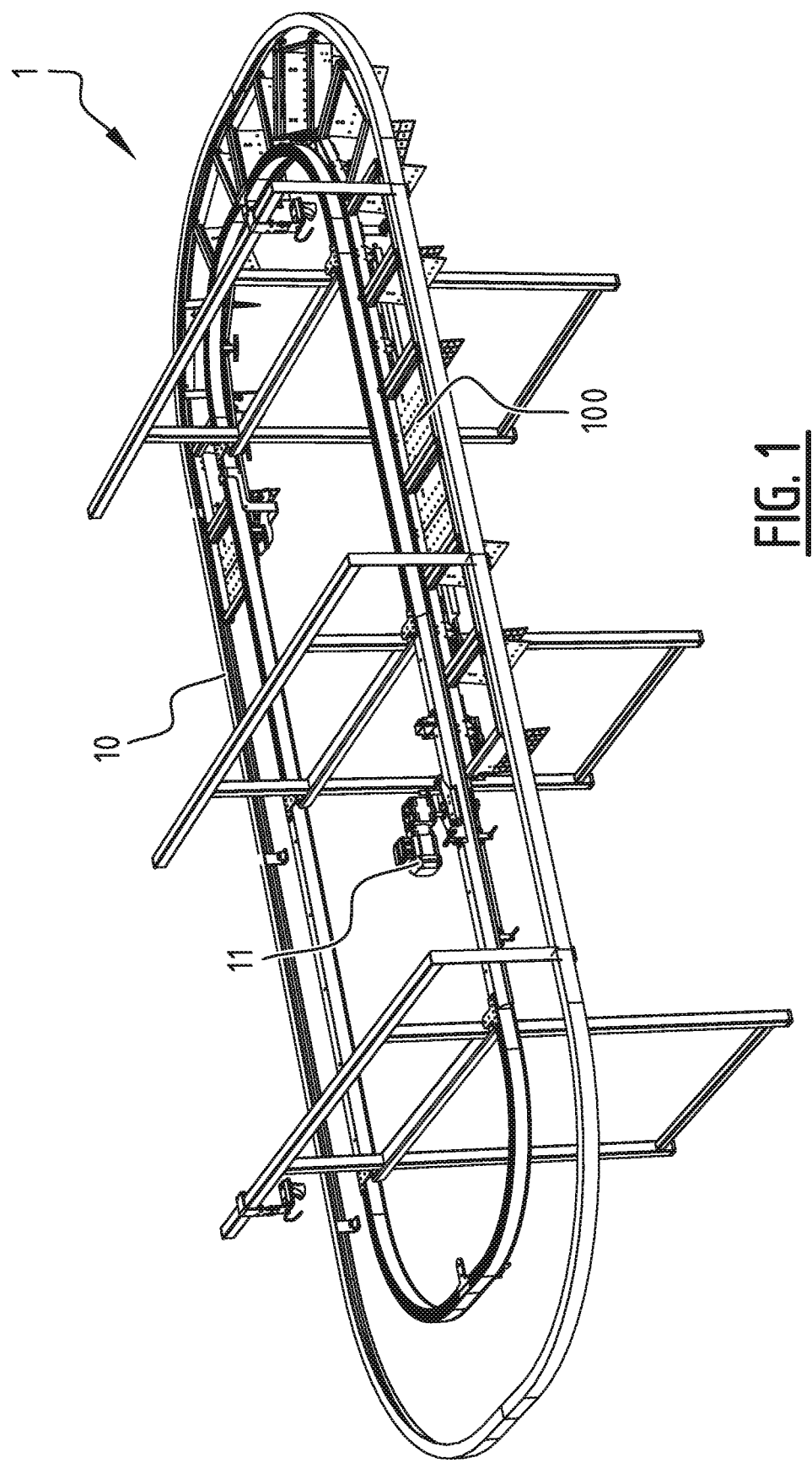
FIG. 1 illustrates an embodiment of a bomb bay sorter in accordance with the invention.
Figure 2:
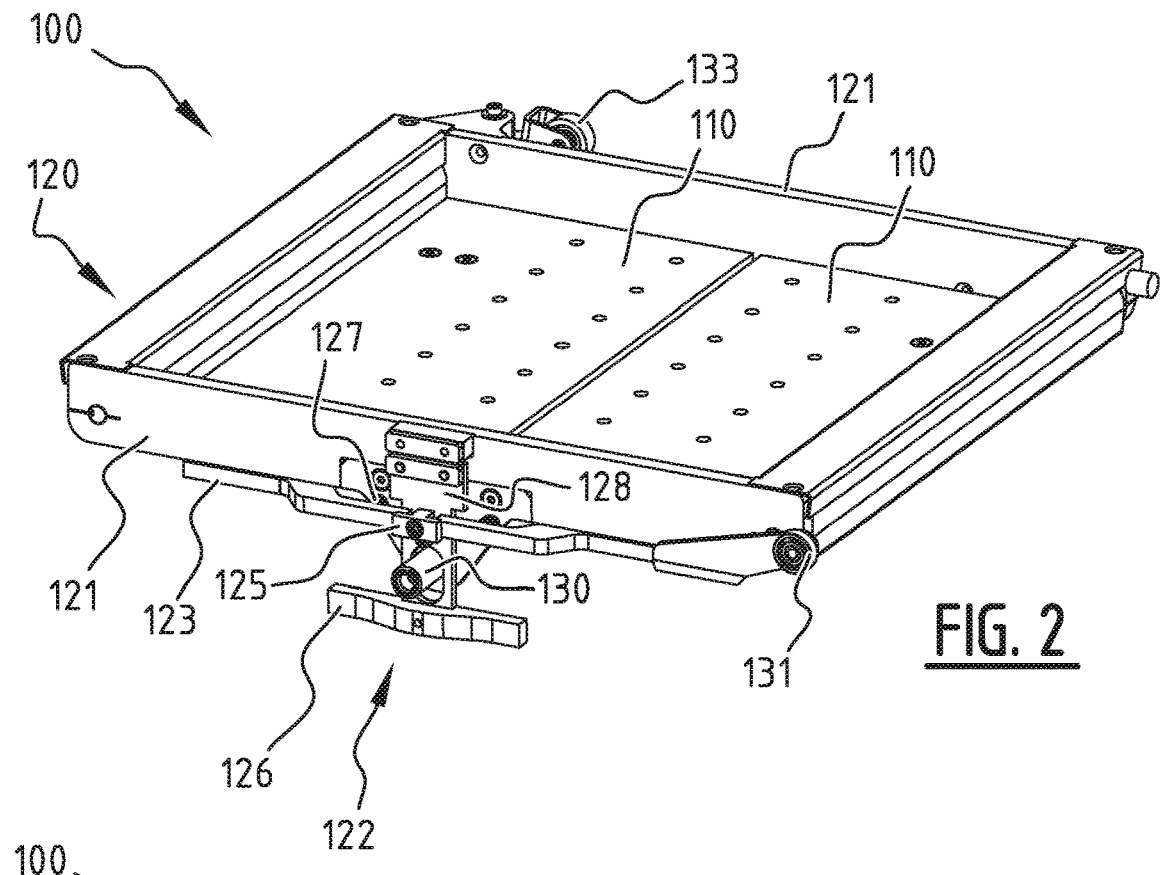
FIGS. 2 and 3 illustrate a tray of the bomb bay sorter of FIG. 1 in a closed position and a fully opened position, respectively.
Figure 6:
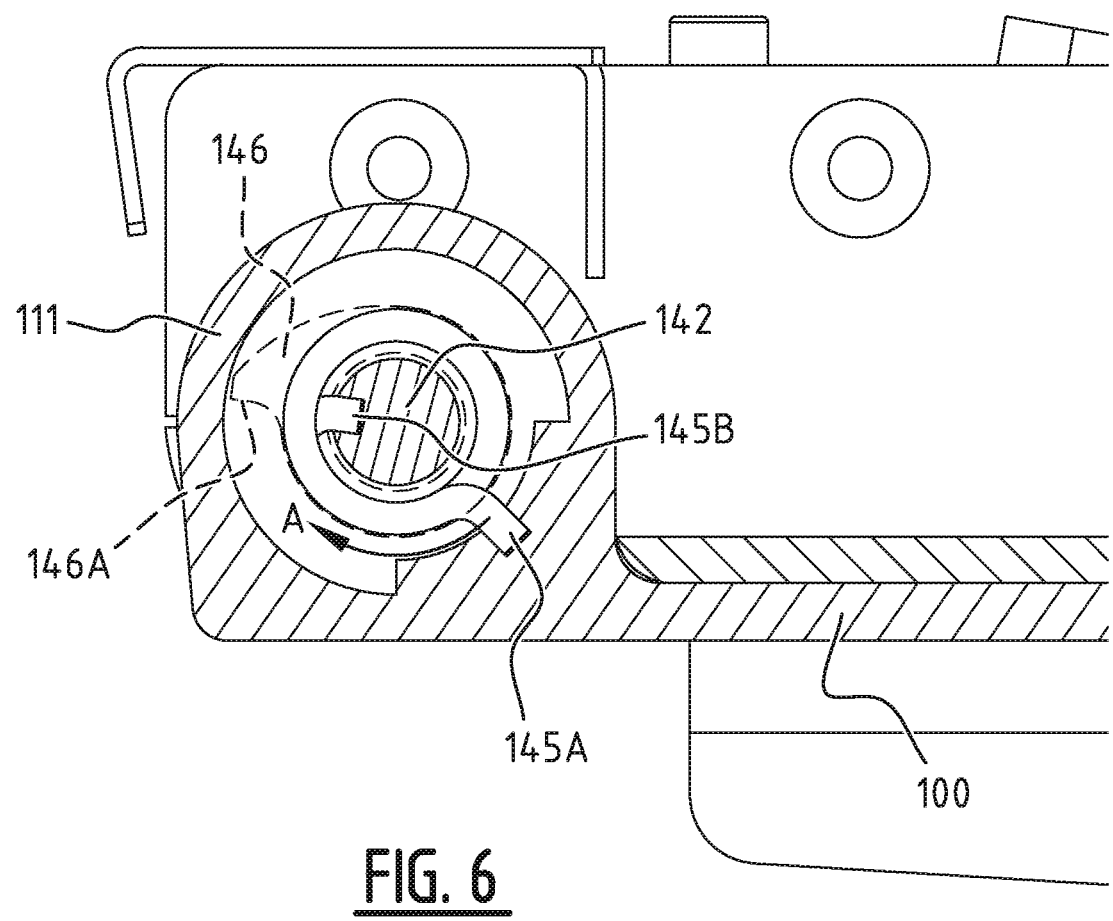
Figure 7:
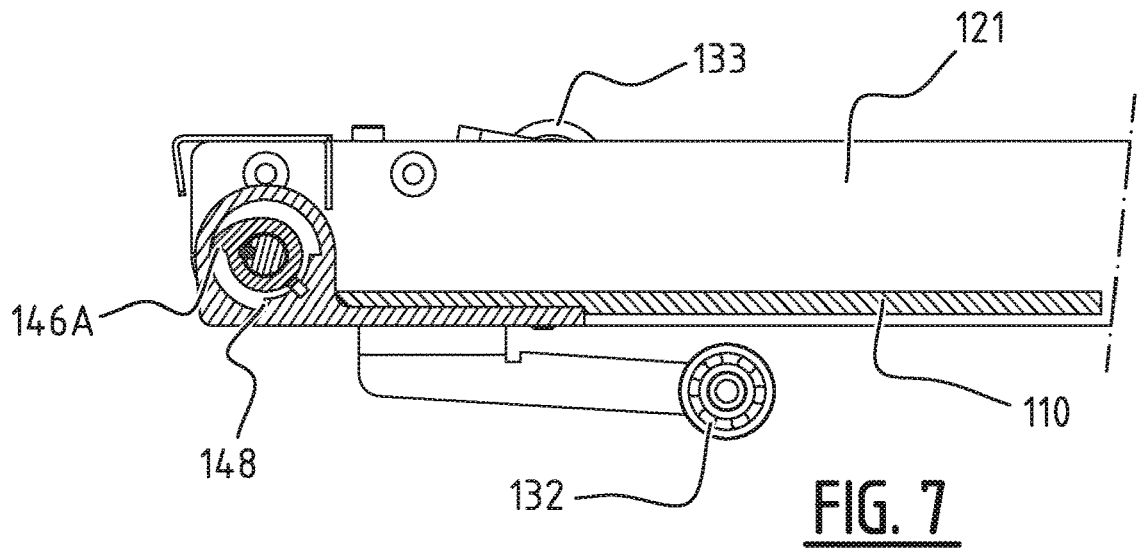
Figure 8:
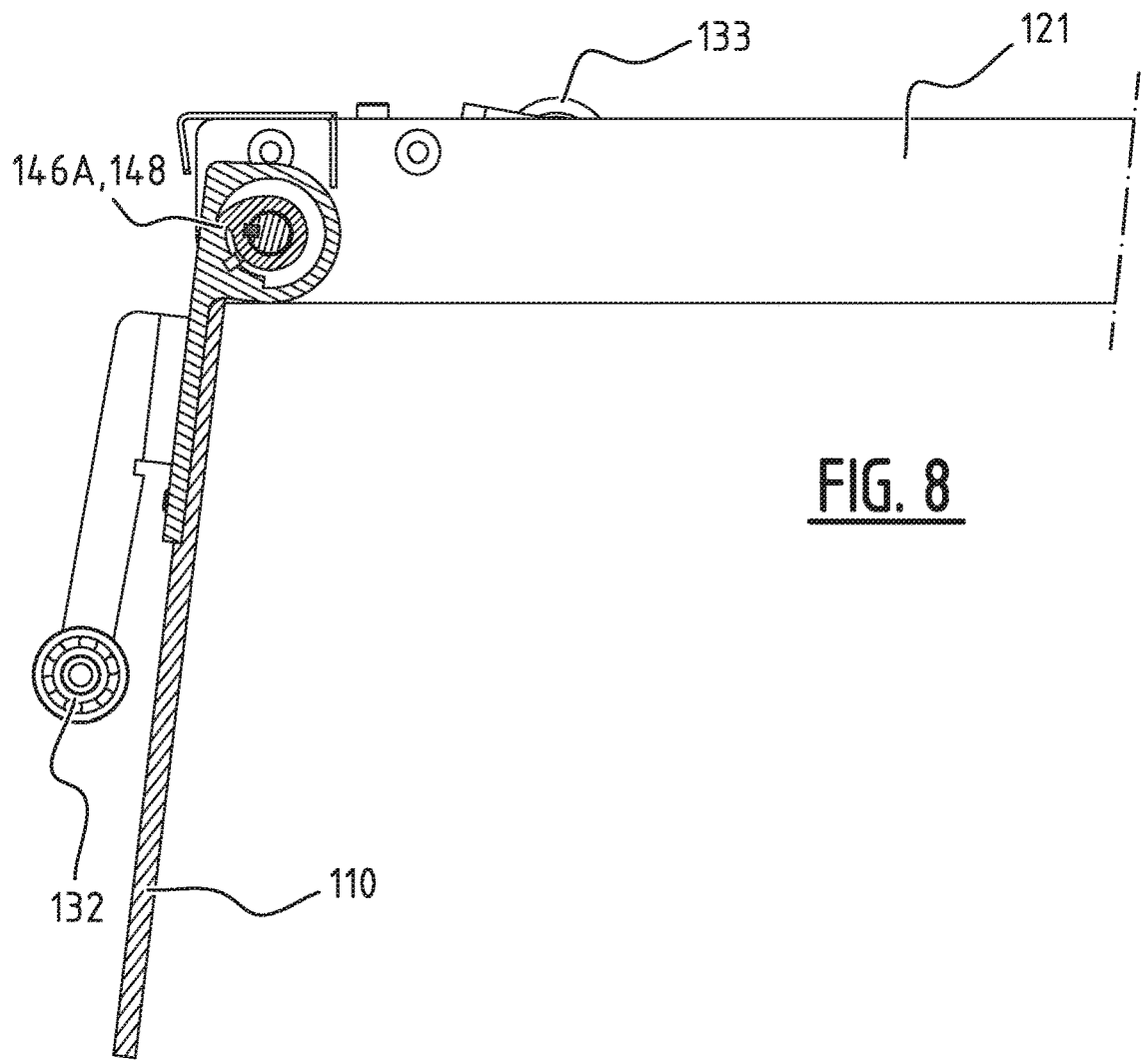
Figure 9:
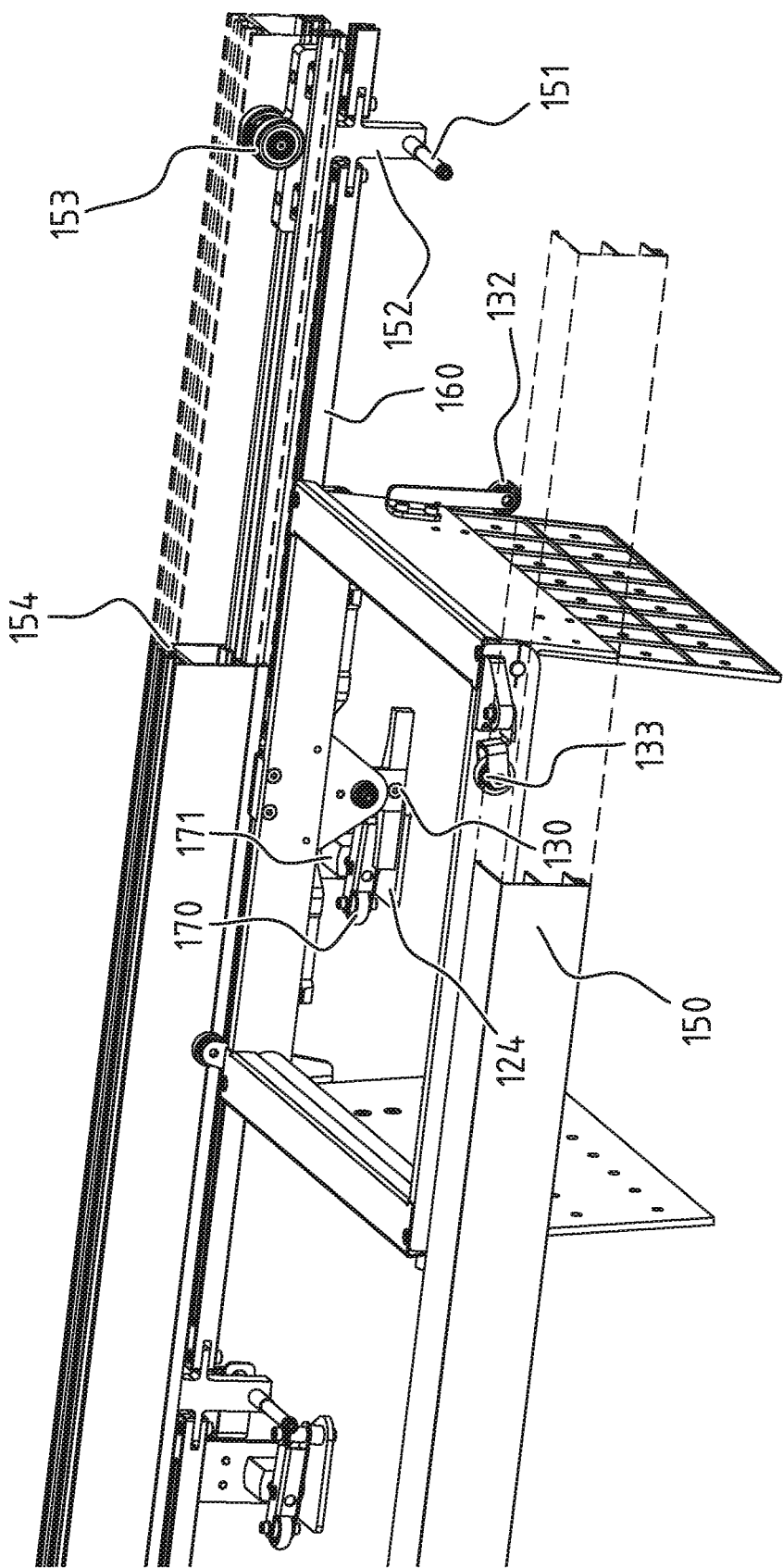
Figure 10:
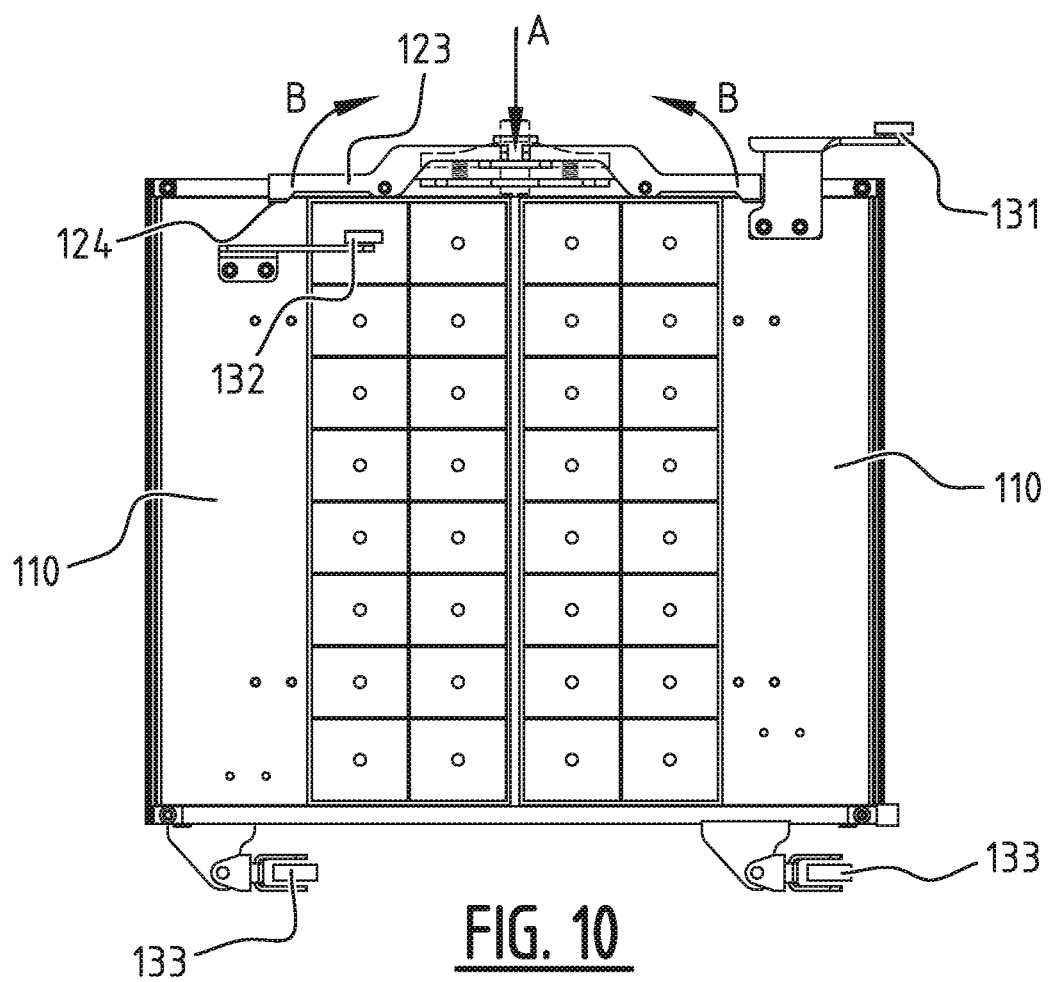
Figure 11:
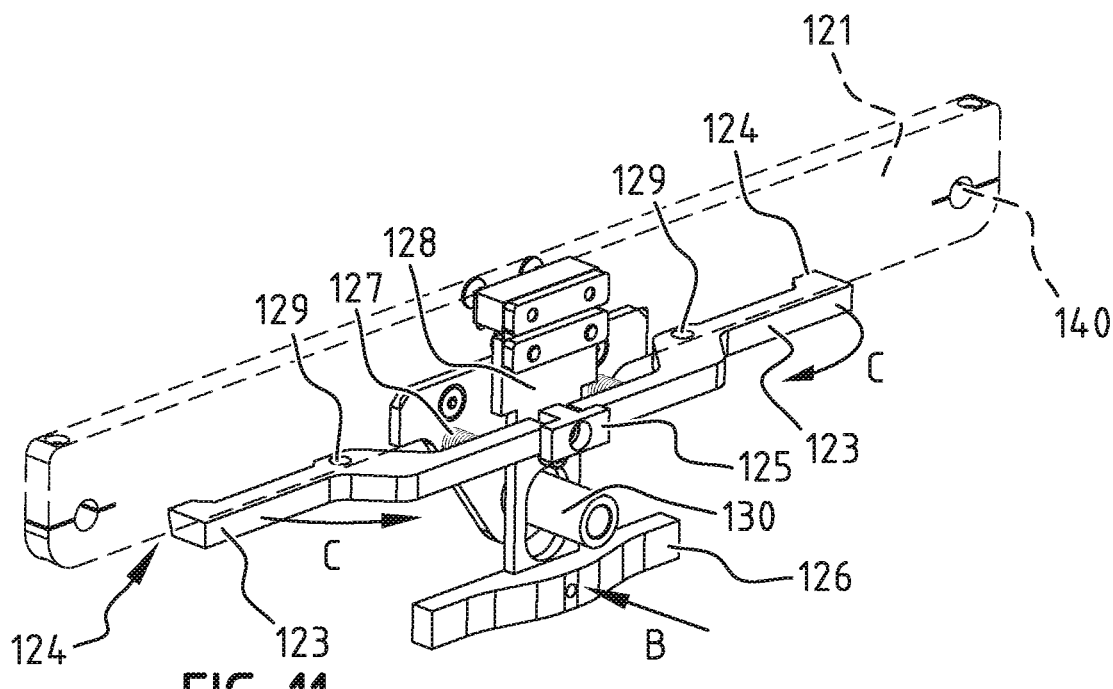
Figure 12:
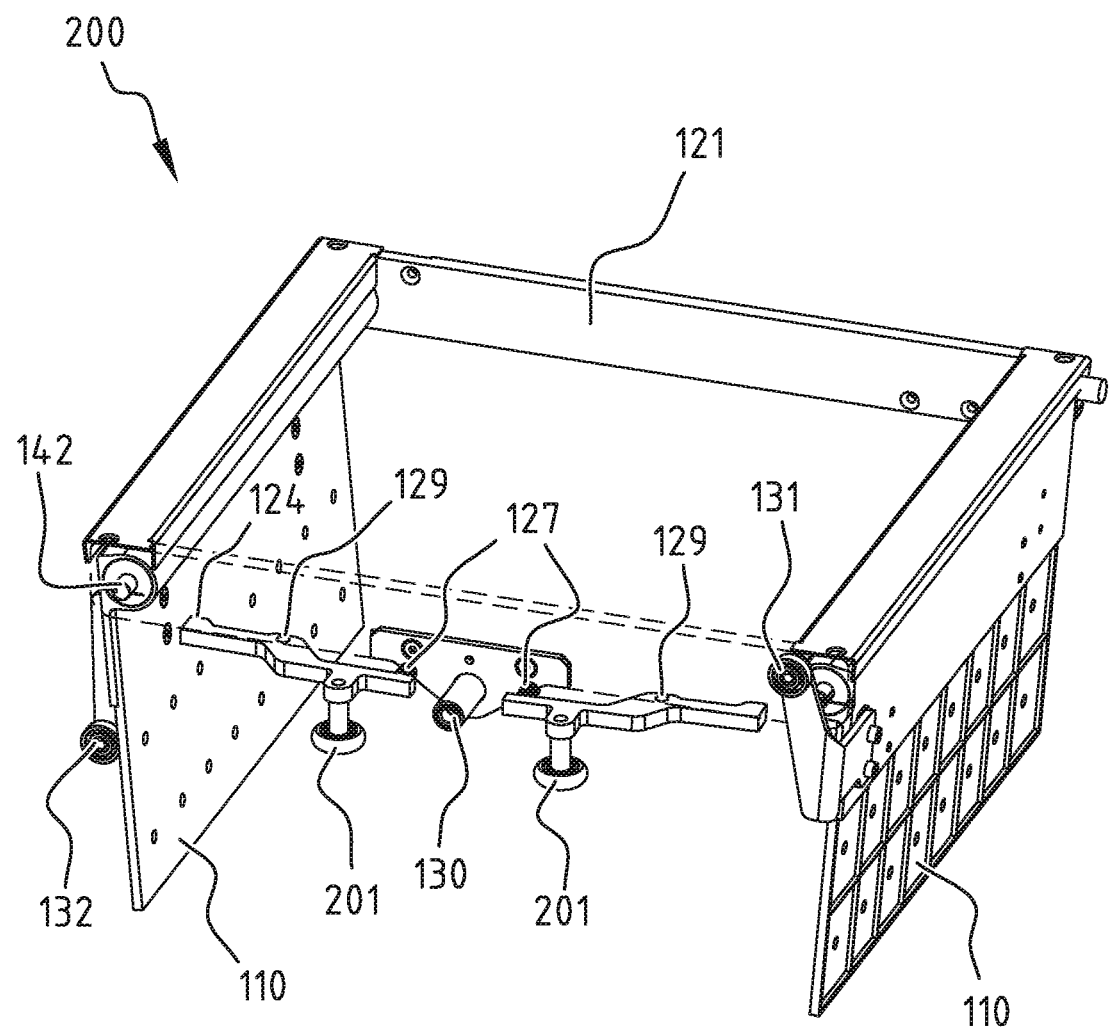
Figure 13:
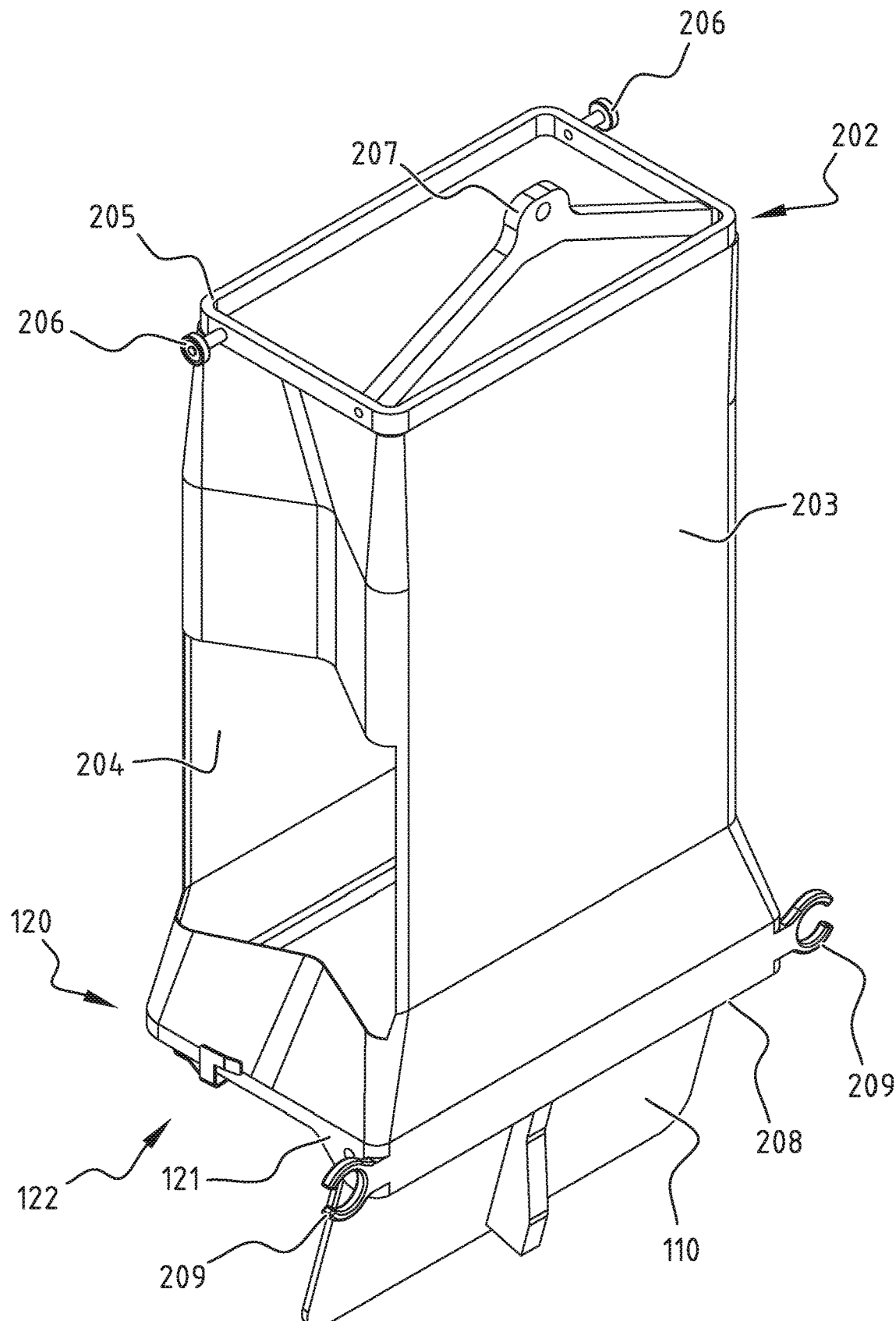
Figure 14:
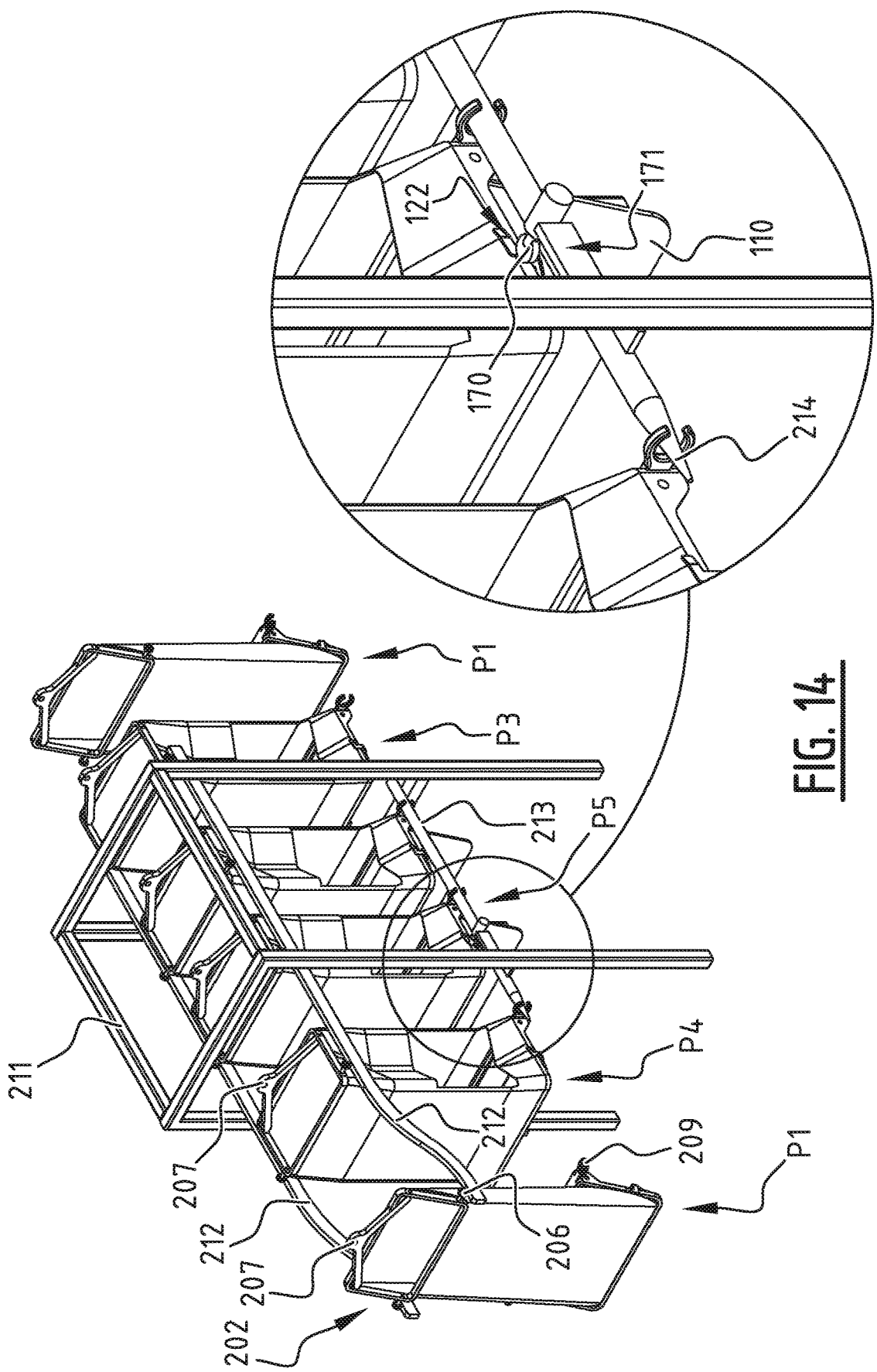

FIGS. 6, 7, and 8 illustrate detailed cross sectional views of the tray shown in FIG. 2;

FIG. 9 illustrates the conveying system of the bomb bay sorter of FIG. 1;

FIG. 10 illustrates a bottom view of the tray shown in FIG. 2;

FIG. 11 illustrates the locking member of the tray shown in FIG. 2;

FIG. 12 illustrates a different embodiment of a tray in accordance with the invention;

FIG. 13 illustrates a further different embodiment of a tray in accordance with the invention, in a fully opened position; and FIG. 14 illustrates a segment of a further embodiment of a bomb bay sorter in accordance with the present invention in which system the tray of FIG. 13 is used. FIG. 1 illustrates an embodiment of a bomb bay sorter 1 in accordance with the present invention. It comprises an endless conveying system 10 and a plurality of trays 100. Actuator 11, in the form of an electric motor, drives conveying system 10 such that trays 100 are transported between various positions. As an example, conveying system 10 may be configured to allow a user to arrange one or more objects in the trays 100 at a given position and to then transport trays 100 along a plurality of discharge positions. At each discharge position, a tray 100 can be controlled to have its tray doors 110 remain closed or to open tray doors 110 to allow the object(s) held in that particular tray 100 to fall down into a box or bag. In this manner, conveying system 10 can be used to sort objects into one or more boxes or bags. As will be explained later, at the end of conveying system 10, more in particular after the last discharge position, trays 100 will be closed by closing profiles 12, 13 that engage pushing rollers 131, 132, respectively, that are coupled to tray doors 110 of each tray 100.

Figure 3:
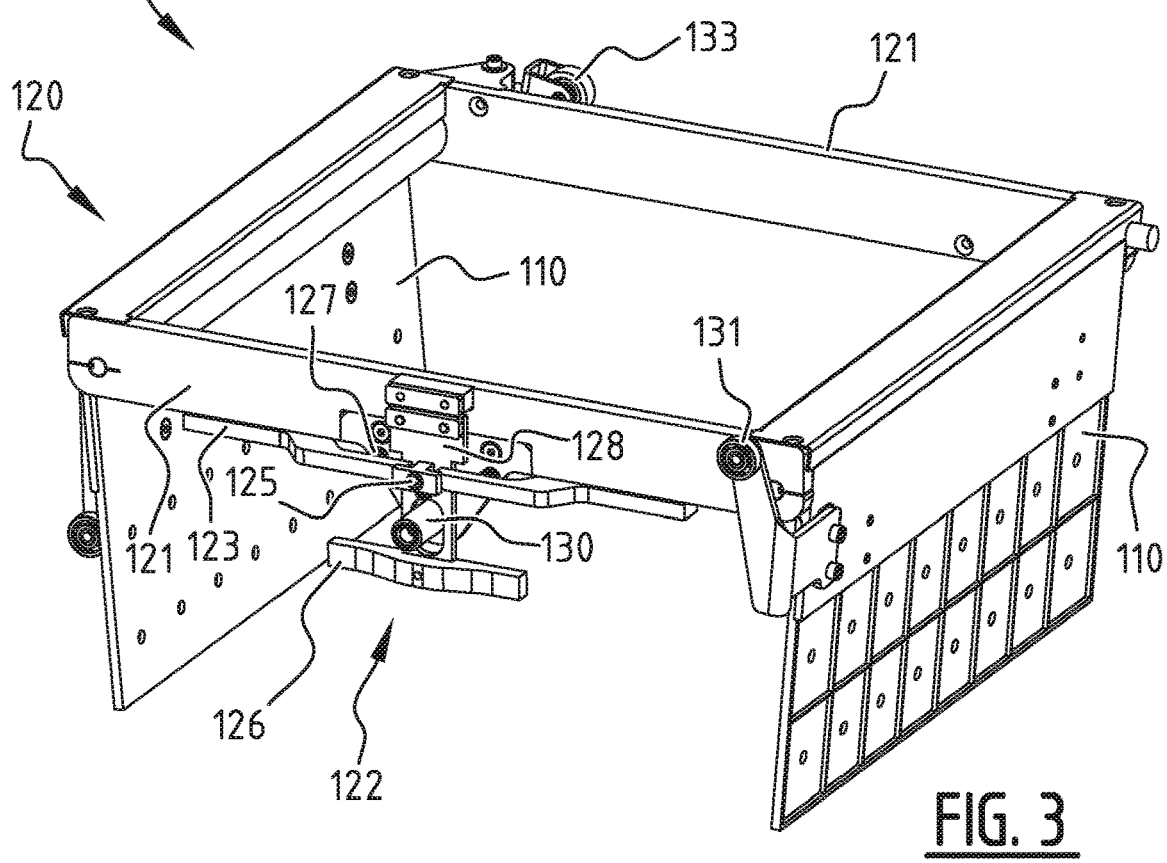

FIGS. 2 and 3 illustrate a tray 100 of bomb bay sorter 1 in a closed position and a fully opened position, respectively. As shown, tray 100 comprises a tray body 120 that includes a tray frame 121. Tray body 120 is coupled to conveying system 10 as will be explained later. Furthermore, tray doors 110 are each hingedly connected to tray body 120. Tray body 120 comprises a locking member 122 by which tray doors 110 can be kept in the closed position shown in FIG. 2. Locking member 122 comprises an arm 123 which ends or is connected to a protruding member 124; see also FIG. 11. When tray door 110 is in the closed position, protruding member 124 extends underneath tray doors 110 thereby preventing a downward rotational movement of tray doors 110.

Arms 123 are hingedly connected to tray frame 121 using respective hinges 129. Ends of arms 123 lie against a T-shaped coupling part 125, which part is fixedly connected to leaf spring 128. This latter spring is fixedly connected to tray frame 121. Springs 127 are arranged in between leaf spring 128 and arms 123. Furthermore, leaf spring 128 is provided with a hole through which a coupling part 130 protrudes that allows tray 100 to be mounted in conveying system 10 as will be explained later. At the end of leaf spring 128, an actuating surface 126 is provided.

Tray doors 110 are each connected to respective pushing rollers 131, 132. Moreover, on one end of tray 100, a guiding roller 133 is provided by which tray 100 can be mounted in conveying system 10. This latter roller is arranged on an opposite side of tray 100 relative to coupling part 130.

Figure 4:
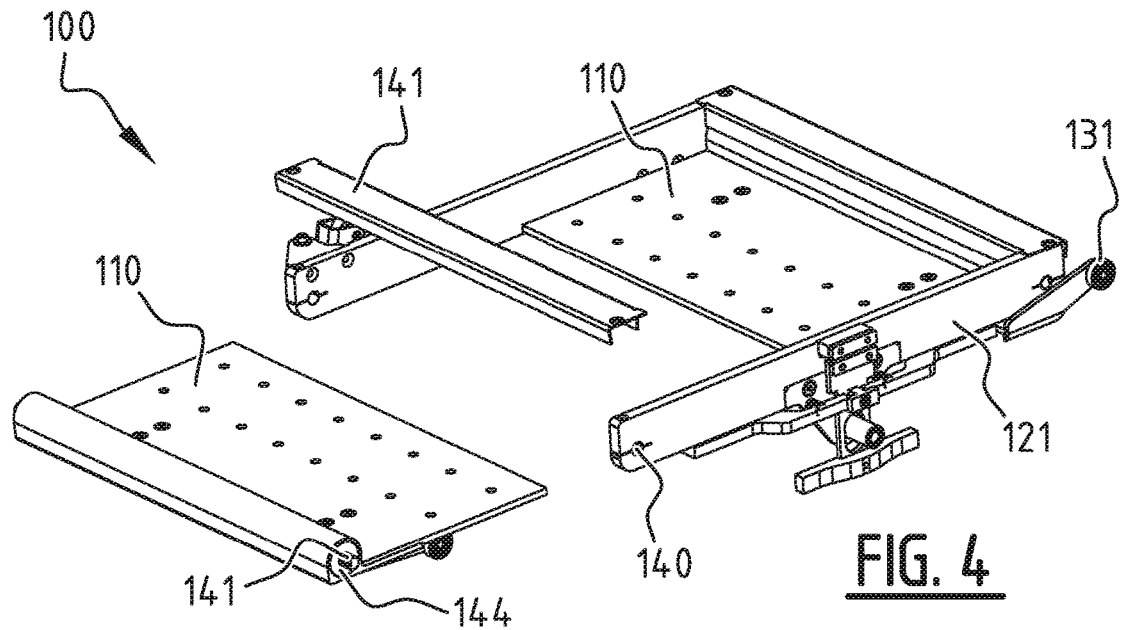
FIG. 4 illustrates a partially exploded view of the tray shown in FIG. 2.
Figure 5:
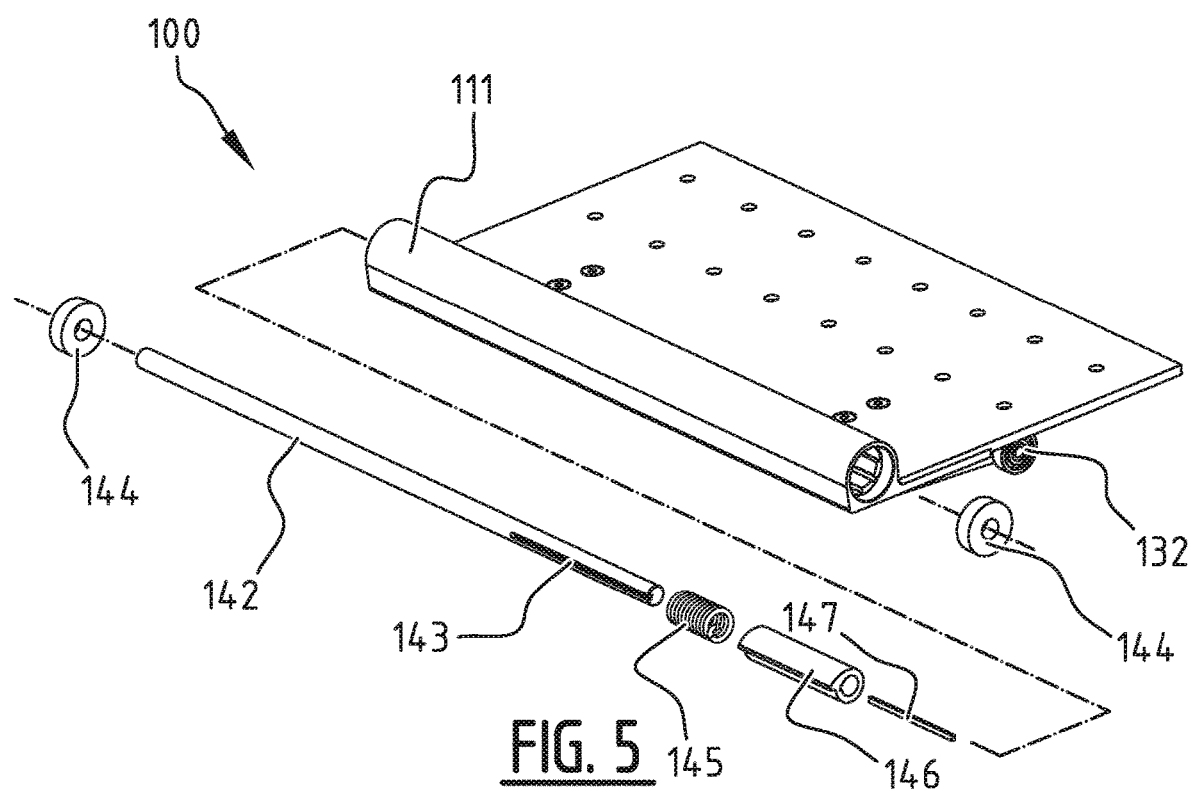
FIG. 5 illustrates an exploded view of a tray door of the tray shown in FIG. 2.

FIGS. 4 and 5 provide different (partially) exploded views of tray 100. As can be seen in FIG. 5, tray door 110 is provided with a shaft channel 111 in which a shaft 142 is arranged that is fixedly connected to tray frame 121 using a pair of shaft mounting openings 140. Around shaft 142, a torsion spring 145 is arranged. More in particular, a second end 145B of torsion spring 145 is attached in a groove 143 in shaft 142. A first end 145A of torsion spring 145 is attached in a recess in an inside wall of shaft channel 111; see FIG. 6. Moreover, the inside wall of shaft channel 111 defines a protruding surface 148.

As illustrated in FIG. 5, a damper 146 is also arranged around shaft 142 axially offset from torsion spring 145. Using an attachment rod 147, damper 146 is fixed relative to shaft 142. In addition, damper 146 defines a support surface 146A. The shaft channel 111 and components arranged therein are covered by a cover 141 that is fixedly connected to tray frame 121.

Next, the working principles of tray 100 will be explained referring to FIGS. 6, 7, 8, and 11. First, it is noted that torsion spring 145 is configured to provide a spring biasing force that urges shaft channel 111 and tray door 110 it is connected to, to rotate relative to shaft 142 and thereby relative to tray frame 121. The direction of this rotation is indicated by arrow A in FIG. 6. Furthermore, in the situation shown in FIG. 7, the spring biasing force exerted by torsion spring 145 exceeds a second predefined threshold. However, downward rotation of tray door 110 is prevented by protruding member 124 extending underneath tray door 110.

Now referring to FIG. 11, when actuation surface 126 is engaged, more in particular pushed against in the direction indicated by arrow B, leaf spring 128 will be pushed towards tray frame 121 against the spring biasing force caused by springs 127. In addition, leaf spring 128 may itself also resist to this motion. Instead of leaf spring 128, non-resilient materials could also be used.

Due to the motion of leaf spring 128, arms 123 will be engaged by T-shaped coupling part 125 which is fixedly connected to leaf spring 128. As a result, arms 123 will rotate around hinges 129 as shown by arrows C. This rotational movement of arms 123 will result in protruding members 124 to move from underneath tray doors 110 thereby releasing the locking of the rotational movement of tray doors 110. Consequently, tray door 110 will rotate from the situation shown in FIG. 7, i.e. the closed position, to the situation shown in FIG. 8, i.e. the opened position.

As shown in FIG. 8, in the opened position, support surface 146A will engage protruding surface 148 of the inside wall of shaft channel 111. The contact between these surfaces will dampen the rotational movement of tray doors 110. In an embodiment, damper 146 is made of resilient material, preferably comprising a resilient polymer, more preferably a visco-elastic polymer, and even more preferably a thermoset, polyether-based, polyurethane material. When made of a resilient material, support surface 146A will generally first move to absorb the kinetic energy of tray door 110 before moving back to an equilibrium position. It is important to note that in this position, torsion spring 145 still provides a biasing force that exceeds a first predefined threshold that is smaller than the second predefined threshold. Put differently, torsion spring 145 causes protruding surface 148 to push against support surface 146A. By means of this force, the position of tray doors 110 can be kept constant during motion caused by conveying system 10. Consequently, less noise will be produced by tray doors 110. In addition, the use of torsion spring 145 allows tray doors 110 to open more quickly than tray doors that rely on gravitational force only.

The abovementioned engagement of actuation surface 126 can be obtained using an engagement member 170, for example in the form of a roller connected to a moveable arm as shown in FIG. 9, that can be moved into engagement with actuation surface 126 by an actuator 171. In FIG. 9, engagement member 170 is positioned at a particular position at which tray doors 11 may be opened and an object held in a tray 100 may be discharged depending on whether engagement member 170 is actuated or not.

The shape of actuation surface 126, i.e. having outer portions arranged closer to tray frame 121 and a central portion arranged further away from tray frame 121, allows engagement member 170 to move into an engagement position before the relevant tray, from which an object should be discharged, has arrived. When a relevant tray arrives, engagement member 170 will first at most engage outer portion of actuation surface 126 slightly. Thereafter, as tray 100 moves further, actuation surface 126 will be pushed against more firmly due to the central portion extending more towards engagement member 170.

As shown in FIG. 3, tray door 110 is connected to pushing rollers 131, 132. When these rollers engage closing profiles 12, 13, as shown in FIG. 1, tray doors 110 are pushed against the spring biasing force of torsion spring 145 from the fully opened position of FIG. 8 to the closed position of FIG. 7. Here, it is noted that at the start of this motion of tray doors 110, protruding member 124 is in a position corresponding to the closed position of tray doors 110 due to the spring biasing force caused by springs 127. However, because protruding member 124 is provided with an inclined surface as shown in FIG. 11, a side of tray door 110 will engage protruding member 124 and will push it in the direction shown by arrows C in FIG. 11. After tray doors 110 have move past protruding members 124, they will snap back, due to the spring biasing force provided by springs 127, into the closed position shown in FIG. 7.

FIG. 9 illustrates how trays 100 are mounted in conveying system 10. On one side of trays 100, guiding roller 133 is moveably received in a guiding profile 150. On the opposite side of tray 100, coupling part 130 is connected to a coupling pin 151. This pin is fixedly connected to a guiding carriage 152. A guiding roll 153 is rotatably connected to guiding carriage 152 and is moveably received in a guiding profile 154. The guiding carriages 152 corresponding to the respective trays 100 are mutually connected using tray interconnect bars 160. To move trays 100, actuator 11, shown in FIG. 1, may comprise a pair of spaced part rollers in between which tray interconnect bars 160 pass. At least one of these rollers can be driven to move trays 100.

FIG. 13 illustrates a further embodiment of a tray 200 in accordance with the present invention. Here, the same reference signs are used to indicate identical or similar components as for tray 100.

Tray 200 differs from tray 100 in that each tray door 100 can be controlled individually. This is achieved by disconnecting the mechanical coupling between arms 123 and to allow each arm 123 in FIG. 12 to be actuated individually and separately. To this end, each arm 123 may be provided with a respective actuation roller 201 that is configured to engage a suitable engagement member, similar to engagement member 170, arranged at various positions in conveying system 10. Here, a single engagement member 170 can be used to operate both arms 123. For example, such an engagement member may be configured to engage a first roller 201 while not engaging the second roller 201, for example because tray 200 has not yet moved in a position in which both rollers 201 can be actuated. It is therefore possible to change how tray doors 110 are opened from simultaneously to sequentially. Using individual control of tray doors 110 may allow a better control of how objects held in tray 200 are discharged. For example, when the most upstream tray door 110 is opened first when transporting relatively small products, these products may slide forward before falling downward. Hence, the position of object(s) in the box or bag in a direction perpendicular to shaft 142 can be controlled by choosing how to open different tray doors 110.

To achieve individual and separate control, bomb bay sorter 1 may comprise a respective engaging unit including an actuator 171 and engaging member 170 for engaging rollers 201 for the respective tray doors 110. Bomb bay sorter 1 may further comprise a controller (not shown) for individually and separately controlling the engaging units. Alternatively, the engaging unit illustrated in FIG. 9 can be modified to engage rollers 201 for the respective tray doors. In this case, bomb bay sorter 1 may further comprise a controller (not shown) for controlling the engaging unit to engage rollers 201 at respective and different moments in time.

FIG. 13 illustrates a further embodiment of tray 202 in accordance with the invention, in a fully opened position. In this figure, components having a similar or identical function as in tray 100 of FIG. 2 will be indicated using the same reference sign.

Tray 202 comprises, on top of tray body 120, a pocket body 203 connected to a tray frame 121, preferably around its complete circumference. Arranged on top of pocket body 203 is an upper frame 205, again preferably around its complete circumference. In the shown embodiment, upper frame 205 has a shape that is substantially the same as tray body 120, more in particular a rectangular shape, but it may also have a different shape.

Tray 202 further comprises a tray guide bar 208 as part of tray frame 121. Either side of guide bar 208 is provided with a tray guide hook 209, configured to be connected to a conveying system that will be described later in more detail in conjunction with FIG. 14.

Pocket body 203 can be made of an easily deformable and/or sufficiently strong material such as a plastic or cloth. To allow a user to fill tray 202, for example by placing a product in it, an opening 204 may be provided in the side of pocket body 203. Additionally, a product may be added to tray 202 through a top opening of pocket body 203, if provided. While the upper and lower cross-sections of pocket body 203 are limited by the respective frames pocket body 203 is connected to, the intermediate part may have basically any shape as long as arranging upper frame 205 in a substantially horizontal position will make tray body 120 also take such a position.

Attached to upper frame 205 are a hanging member 207 and one or more frame leveling rolls 206. More in particular, hanging member 207 is tiltably attached to a first side of upper frame 205, and one or more frame leveling rolls 206 are rotatably attached on a second side of upper frame 205, opposite of the first side. The axis around which hanging member 207 may tilt is substantially parallel to the axis around which frame leveling roll(s) 206 may rotate.

Pocket sorters are known in the art. Similar to the embodiment shown in FIGS. 13 and 14, products are transported using pockets. However, unlike the present invention, these pockets are closed at the bottom. They are not, as illustrated in FIG. 13, provided with a tray door 110. For that reason, tray 202 and the sorter shown in FIG. 14 will be referred to as corresponding to a bomb bay sorter.

FIG. 14 illustrates a segment of a further embodiment of a bomb bay sorter in accordance with the present invention in which system the tray of FIG. 13 is used. As shown, the bomb bay sorter comprises a sorter frame 211, to which upper frame guiding members 212 and tray body guiding members 213 are attached. Not shown in FIG. 14 is a dragging cable that passes through the opening in hanging member 207, and of which movement conveys trays 202.

Trays 202 take on multiple positions when they are conveyed through the conveying system. Initially, in a position similar to position P1 on the right, being hung only from hanging member 207, trays 202 may sag as the weight of tray 202 tilts upper frame 205.

Then, in position P1 on the left, moving forward from left to right in FIG. 14, leveling rolls 206 of tray 202 come into contact with upper frame guiding elements 212, a front part of which is arranged at the height at which one or more leveling rolls 206 are known to be suspended. As a further part of upper frame guiding members 212 inclines upward, leveling rolls 206 are dragged behind hanging member 207, effectively lifting both sides of upper frame 205. In particular, the further part of upper frame guiding members 212 will extend up to the height at which the tilting axis of hanging member 207 is known to be suspended in position P1, effectively levelling upper frame 205.

Moving forward to position P4, one or more tray guide hooks 209 of tray 202 are received around tray body guiding members 213 that level and stabilize tray body 120 and ensure that locking member 122 will pass engaging member 170 at the appropriate height. Tray body guiding members 213 are preferably provided with catching pins 214 which help receiving tray guide hooks 209.

Passing position P5, engaging member 170 will unlock locking member 122 allowing tray door 110 to be opened under spring bias as mentioned in conjunction with tray 100 shown in FIG. 2. In particular, tray door 110 may embodied similar as tray door 110 in FIGS. 2, 5, and 6.

Embodiments of the conveying system of FIG. 14 may open all passing trays 202 by having a passive, statically arranged engaging member 170. Alternatively, embodiments are conceivable in which only some trays 202 are opened as engaging member 170 is actuated by actuator 171 to move back and in forth in dependence whether a tray 202 needs to be opened or not.

After being opened, trays 202 that are being moved forward may again be closed by closing rolls, presently not shown in the figure, that engage a ramp that is provided on tray door 110 as shown in FIG. 13. To that end, locking member 122 may be shaped such that it locks tray door 110 in the position shown in FIG. 13, but that it allows tray door 110 to move back from the open position shown in FIG. 14 to the closed position of FIG. 13. Open-ended tray body guiding members 213 allow tray guiding hooks 209 to pass them, such that trays 202 are again solely guided by upper frame guiding members 212. This is shown as position P3. Similarly, open-ended upper frame guiding members 212 allow leveling rolls 206 to pass, such that trays 202 are again solely suspended from hanging element 207 alone, which is shown as position P1 on the right. In other embodiments, tray body guiding members 213, and upper frame guiding members 212, may extend throughout the conveying system.

In description above, the present invention has been described using detailed embodiments thereof. However, the skilled person will readily appreciate that the present invention is not limited to these embodiments and that the scope of the present invention is defined by the appended claims and their equivalents.

LIST OF REFERENCE SIGNS

1. Bomb bay sorter
10. Conveying system
11. Actuator
12. Closing profile
13. Closing profile
100. Tray
110. Tray door
111. Shaft channel
120. Tray body
121. Tray frame
122. Locking member
123. Arm
124. Protruding member
125. T-shaped coupling part
126. Actuation surface
127. Spring
128. Leaf spring
129. Hinge
130. Coupling part
131. Pushing roller
132. Pushing roller
133. Guiding roller
140. Shaft mounting opening
141. Cover
142. Shaft
143. Shaft groove
144. Bearing
145. Torsion spring
145A. First end torsion spring
145B. Second end torsion spring
146. Damper
146A. Support surface damper
147. Attachment rod
148. Protruding surface shaft channel
150. Guiding profile
151. Coupling pin
152. Guiding carriage
153. Guiding roll
154. Guiding profile
160. Tray interconnect bar
170. Engaging member
171. Actuator
200. Tray
201. Actuation roller
202. Tray
203. Pocket body
204. Pocket body opening
205. Upper frame
206. Frame leveling rolls
207. Hanging member
208. Tray guide bar
209. Tray guide hook
211. Sorter frame
212. Upper frame guiding members
213. Tray body guiding members
214. Catching pin
P1-P5 Positions of tray
A, B Arrows

The invention claimed is:

1. A bomb bay sorter, comprising:
  a conveying system;
  a tray, comprising:
    a tray body coupled to the conveying system, the tray body comprising a support surface;
    a tray door that is hingedly connected to the tray body and that can be closed and opened to carry and release an object held in the tray, respectively;
    a locking member to releasably lock the tray door in a closed position;
  wherein the tray body further comprises a spring for spring biasing the tray door relative to the tray body to urge the tray door to open, wherein, when the tray door is fully opened, it rests against the support surface under the influence of a spring biasing force provided by said spring that exceeds a first non-zero threshold, wherein the tray body comprises a tray frame and a door shaft that defines an axis of rotation of the tray door, wherein the spring comprises a torsion spring arranged around the door shaft;

wherein the tray door comprises a shaft channel in which the door shaft is rotatably accommodated, wherein the torsion spring has one end fixed coupled to the door shaft and another end to an inside wall of the shaft channel and/or wherein a damper is arranged in the shaft channel and fixed in position relative to the door shaft.

2. The bomb bay sorter according to claim 1, wherein, when the tray door is closed, it experiences a spring biasing force provided by said spring that exceeds a second threshold larger than the first threshold.

3. The bomb bay sorter according to claim 1, wherein the tray door comprises the damper for damping at least a part of the movement of the tray door from the closed position to a fully opened position, wherein the damper is configured to provide a damping force for damping said movement of the tray door only after the tray door has rotated from the closed position over a predefined threshold angle relative to the tray body, wherein the damper is made of resilient material, and wherein the damper defines said support surface, and wherein, in the fully opened position, compression of the resilient material compensates the spring force exerted by said spring on the tray door.

4. The bomb bay sorter according to claim 1, wherein the door shaft is fixed relative to a frame body, wherein the tray door is rotatably coupled to the door shaft, and wherein the torsion spring is arranged in between the door shaft and the tray door, wherein the door shaft is positioned perpendicular to a movement direction of the tray.

5. The bomb bay sorter according to claim 1, wherein the inside wall of the shaft channel comprises a protruding surface that is configured to engage the support surface of the damper after a predefined relative rotation of the door shaft and tray door.

6. The bomb bay sorter according to claim 1, wherein the conveying system comprises an engaging unit having an engaging member that is configured to selectively engage the locking member to allow the tray door to open, wherein the engaging unit is arranged at a fixed position in the conveying system, wherein the engaging unit comprises an actuator for actuating the engaging member to engage the locking member.

7. The bomb bay sorter according to claim 1, wherein the locking member comprises a protruding member that, when the tray door is closed, prevents the tray door from opening.

8. The bomb bay sorter according to claim 7, wherein the protruding member extends underneath the tray door and/or an arm configured to, when the locking unit is engaged by an engaging member, move the protruding member away from the tray door to allow it to open, wherein the arm is configured to move the protruding member between a first position in which it may lock the tray door, and a second position in which it cannot lock the tray door, wherein the arm is spring biased by a further spring to urge the arm to the first position.

9. The bomb bay sorter according to claim 8, wherein the protruding member comprises an inclined surface to allow the tray door to close when the tray door is pushed against in a manner that overcomes the spring biasing caused by said spring, wherein the conveying system comprises a first closing member and wherein the tray door comprises a second closing member, wherein the first closing member is configured to engage the second closing member to thereby push the tray door to close, wherein the first closing member is arranged at a fixed position in the conveying system.

10. The bomb bay sorter according to claim 1, wherein the tray comprises a pair of said tray doors that are oppositely arranged, and a pair of said locking members to releasably lock the respective tray doors in the closed position.

11. The bomb bay sorter according to claim 9, wherein an operation of opening a first tray door of said pair of tray doors is mechanically coupled to an operation of opening a second tray door of said pair of tray doors such that the first and second tray door open at substantially the same time.

12. The bomb bay sorter according to claim 10, wherein each tray door can be opened separately and individually, wherein the conveying system comprises a respective engaging unit for engaging the locking members for the respective tray doors, the respective engaging units each having an engaging member that is configured to selectively engage the respective locking member to allow the tray door to open, wherein the bomb bay sorter further comprises a controller for individually and separately controlling the engaging units, wherein the engaging unit is configured to engage the locking members for the respective tray doors, wherein the bomb bay sorter further comprises a controller for controlling the engaging unit to engage the respective locking members at respective and different moments in time.

13. The bomb bay sorter according to claim 1, wherein the tray comprises, on opposite sides, guiding members that are received in respective guiding tracks of the conveying system.

14. The bomb bay sorter according to claim 1, comprising a plurality of said trays, each coupled to said conveying system, wherein the trays are mutually coupled using coupling members that are each hingedly connected, on opposite sides, to adjacent trays, wherein the conveying system comprises a driving unit for driving the coupling members to cause the trays to move.

15. The bomb bay sorter according to claim 1, wherein the conveying system is configured to move the tray from a loading position, at which the object is arranged in the tray, to a discharge position, at which the object is released from the tray.

16. The bomb bay sorter according to claim 1, wherein the tray body is rotatably coupled to the conveying system.

17. A tray configured to be used in a bomb bay sorter comprising a conveying system, the tray comprising:
a tray body configured to be coupled to the conveying system of the bomb bay sorter, the tray body comprising a support surface;
a tray door that is hingedly connected to the tray body and that can be closed and opened to carry and release an object held in the tray, respectively; and
a locking member to releasably lock the tray door in a closed position;
wherein the tray body further comprises a spring for spring biasing the tray door relative to the tray body to urge the tray door to open, wherein, when the tray door is fully opened, it rests against the support surface under the influence of a spring biasing force provided by said spring that exceeds a first non-zero threshold, wherein the tray body comprises a tray frame and a door shaft that defines an axis of rotation of the tray door, wherein the spring comprises a torsion spring arranged around the door shaft, wherein the tray door comprises a shaft channel in which the door shaft is rotatably accommodated, wherein the torsion spring has one end fixed coupled to the door shaft and another end to an inside wall of the shaft channel and/or wherein the damper is arranged in the shaft channel and fixed in position relative to the door shaft.

* * * * *